United States Patent
Burkitt et al.

(10) Patent No.: US 8,567,174 B2
(45) Date of Patent: Oct. 29, 2013

(54) VALVE ASSEMBLY FOR DRAINING OIL, MOISTURE, OR WATER FROM A GAS TURBINE ENGINE

(75) Inventors: Edward Burkitt, Lincoln (GB); Gareth Huw Davies, Coleby (GB)

(73) Assignee: Siemens Aktiengesellschaft, Munich (DE)

( * ) Notice: Subject to any disclaimer, the term of this patent is extended or adjusted under 35 U.S.C. 154(b) by 1296 days.

(21) Appl. No.: 12/085,700

(22) PCT Filed: Dec. 12, 2006

(86) PCT No.: PCT/EP2006/069596
§ 371 (c)(1), (2), (4) Date: May 29, 2008

(87) PCT Pub. No.: WO2007/068694
PCT Pub. Date: Jun. 21, 2007

(65) Prior Publication Data
US 2009/0151316 A1   Jun. 18, 2009

Related U.S. Application Data

(60) Provisional application No. 60/749,469, filed on Dec. 12, 2005.

(51) Int. Cl.
*F02C 7/232* (2006.01)

(52) U.S. Cl.
USPC ............... 60/39.094; 60/779; 251/94

(58) Field of Classification Search
USPC ............ 60/782, 785, 39.08, 39.094, 779; 251/89, 94
See application file for complete search history.

(56) References Cited

U.S. PATENT DOCUMENTS

| | | | | |
|---|---|---|---|---|
| 3,360,189 A * | 12/1967 | Cook | | 415/169.1 |
| 3,487,993 A * | 1/1970 | Rannenberg | | 415/28 |
| 4,391,092 A * | 7/1983 | Arnett | | 60/795 |
| 4,565,349 A * | 1/1986 | Tomlin | | 251/29 |
| 4,621,496 A * | 11/1986 | Lamb | | 60/479 |
| 6,056,004 A * | 5/2000 | Agnew | | 137/240 |
| 6,385,958 B2 * | 5/2002 | Leone et al. | | 60/782 |
| 6,442,925 B1 | 9/2002 | Dalton et al. | | |
| 6,637,207 B2 * | 10/2003 | Konezciny et al. | | 60/727 |
| 6,729,135 B1 * | 5/2004 | Norris et al. | | 60/646 |
| 7,155,896 B2 * | 1/2007 | Jansen et al. | | 60/39.094 |
| 2006/0086094 A1 * | 4/2006 | Runkle et al. | | 60/779 |
| 2007/0234738 A1 * | 10/2007 | Borcea | | 60/785 |

FOREIGN PATENT DOCUMENTS

| | | | |
|---|---|---|---|
| JP | 56104122 A | 8/1981 |
| JP | 09137894 A | 5/1997 |
| JP | 2000274206 A | 10/2000 |
| WO | WO 96/02789 A1 | 2/1996 |

* cited by examiner

*Primary Examiner* — Phutthiwat Wongwian
*Assistant Examiner* — Michael B Mantyla

(57) ABSTRACT

A valve assembly is provided for a gas turbine engine with at least two drain valves connected to the gas turbine engine to drain oil and moisture from the engine, an actuator for opening and closing the at least two drain valves, a solenoid valve connected to the actuator and to a regulated air supply for driving the actuator and a safety valve connected to an exhaust of the solenoid valve and to a compressor air supply, the compressor air supply driving the safety valve to prevent the actuator from being vented during engine operation. A method of securely operating a plurality of drain valves is also provided.

16 Claims, 3 Drawing Sheets

VALVE ASSEMBLY FOR DRAINING OIL, MOISTURE, OR WATER FROM A GAS TURBINE ENGINE

CROSS REFERENCE TO RELATED APPLICATIONS

This application is the US National Stage of International Application No. PCT/EP2006/069596, filed Dec. 12, 2006 and claims the benefit thereof. The International Application claims the benefits of the provisional patent application filed on Dec. 12, 2005, and assigned application No. 60/749,469, and is incorporated by reference herein in its entirety.

FIELD OF THE INVENTION

The invention relates to a valve assembly.

BACKGROUND OF THE INVENTION

After washing a gas turbine engine, waste and moisture are removed from the engine via drain valves. At normal operation it is essential that these drain valves remain closed.

Drain valves are used to drain oil, moisture or water from a gas turbine engine after a washing procedure. Usually, drain valves are actuated by a supply of compressor air. If the air supply line was interrupted while the gas turbine engine is in operation, the drain valves could open and the hot gases at high pressures would enter potentially flammable drain tanks.

SUMMARY OF THE INVENTION

An object of the invention is to provide an improved valve assembly.

This object is achieved by the claims. The dependent claims describe advantageous developments and modifications of the invention.

An inventive valve assembly comprises a plurality of drain valves arranged on a gas turbine engine and connected to a single actuator. The actuator has position switches and simultaneously controls the opening and closing of all drain valves. The actuator is connected to and controlled by a solenoid valve comprising an inlet for regulated air that drives the actuator, an actuator inlet/outlet port connected to the actuator and a solenoid exhaust for venting the actuator. The solenoid exhaust port is connected to a safety valve that opens and closes the exhaust path as a function of the pressure at the gas turbine engine compressor exit, where it is connected to. When the pressure at the compressor exit exceeds 1 bar, the safety valve closes the exhaust path thus preventing the actuator from venting. As a consequence the drain valves remain closed.

In another advantageous embodiment the actuator has position switches to provide information on whether the intended position has been reached thus increasing the degree of safety.

It is advantageous when the instrument air is regulated to 3.8 bar or another fixed value giving a reliable and reproducible torque range to the actuator for opening and closing the drain valves.

Such a design of the valve assembly improves operability and reliability.

BRIEF DESCRIPTION OF THE DRAWINGS

The invention will now be further described with reference to the accompanying drawings in which.

Figure 1:
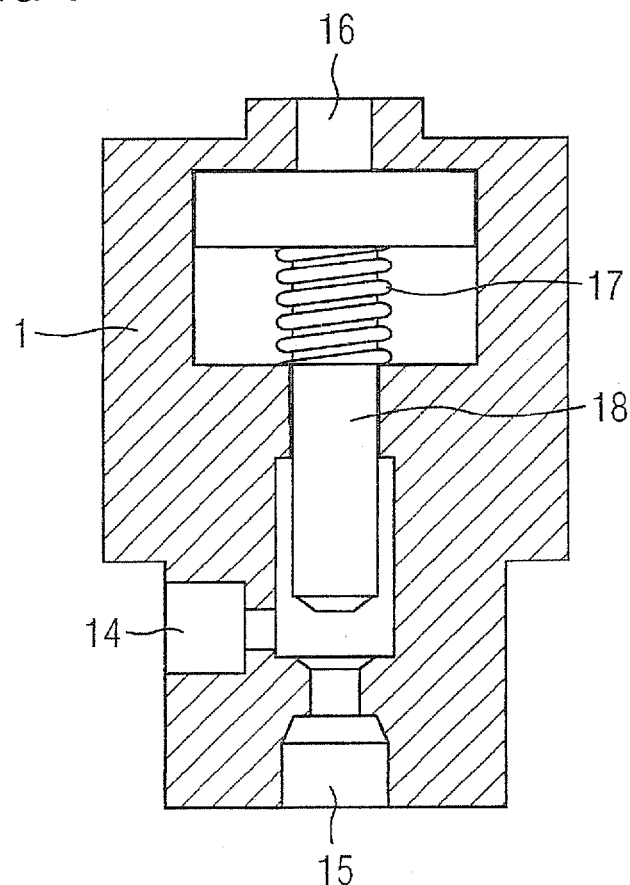
FIG. 1 represents a prior art drain valve.

In the drawings like references identify like or equivalent parts.

DETAILED DESCRIPTION OF THE INVENTION

FIG. 1 shows a section through a type of valve that can be used as normal open (NO) drain valve 1 to drain water from the gas turbine engine 10 after a washing procedure. The valve comprises a waste inlet port 14, a waste outlet port 15 and a top port 16. The valve is actuated by instrument air 6 fed into the top port 16.

If no pressure is supplied to the top port 16, the spring 17 in the drain valve 1 is not energized, the plunger 18 is in the top position and the drain valve 1 is open.

To run the gas turbine engine 10, drain valves 1 have to be closed. Therefore, the plunger 18 is pushed down to close the waste outlet port 15 by applying instrument air 6 to the top port 16. If the instrument air 6 supply line was interrupted, the plunger 18 of the drain valve 1 would move upwards and could lead to the drain valves 1 opening and the hot gases at high pressures entering the potentially flammable drain tanks 11.

Figure 2:
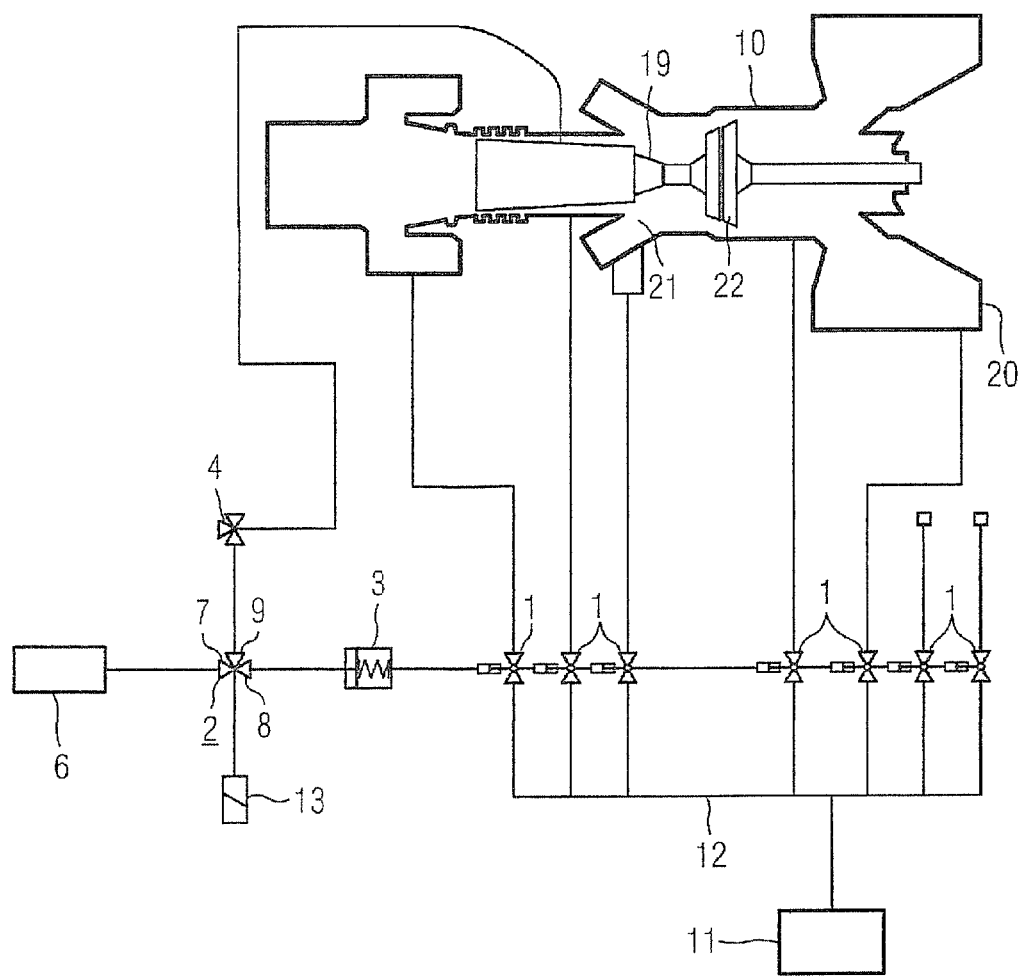
FIG. 2 shows the inventive valve assembly layout.

FIG. 2 shows the view of a general layout of the inventive valve assembly. Drain valves 1 connect through a set of pipes to different spots on the gas turbine engine 10. The junction pipe 12 is connected to a drain tank 11. On the left of FIG. 2 is an actuator driven by instrument air 6 and controlled by the solenoid valve 2. The actuator connects to all drain valves 1 and the solenoid actuator inlet/outlet 8. The solenoid actuator inlet/outlet allows air to flow in both directions, from the solenoid air inlet 7 to the solenoid actuator inlet/outlet 8 and from the solenoid actuator inlet/outlet 8 to the solenoid exhaust 9. The solenoid air inlet 7 connects to instrument air 6. Air only flows in one direction through the solenoid valve 2 to the actuator 3. The solenoid exhaust 9 connects to a safety valve 4. The safety valve in turn connects to a compressor exit 19.

Figure 3:
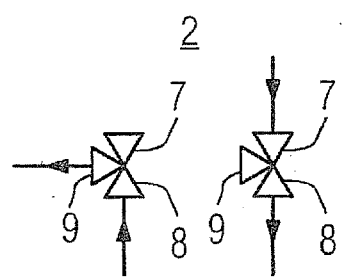
FIG. 3 shows the states of the solenoid.

To understand the working principle of the valve assembly the two possible states of the solenoid valve 2 are briefly explained in FIG. 3. On the left, the solenoid 13 is not energized. Air can enter the solenoid valve 2 by the solenoid actuator inlet/outlet 8 and leave it through the solenoid exhaust 9. There is no connection between solenoid air inlet 7 and solenoid actuator inlet/outlet 8. On the right of FIG. 3 the solenoid 13 is energized. Solenoid air inlet 7 and solenoid actuator inlet/outlet 8 are in communication. Solenoid exhaust 9 is separated from the solenoid air inlet 7 and the solenoid actuator inlet/outlet 8.

Figure 4:
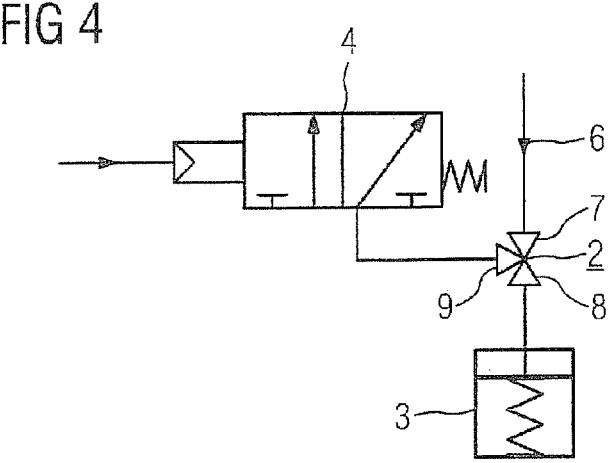
FIG. 4 shows the valves when the turbine is starting.
Figure 5:
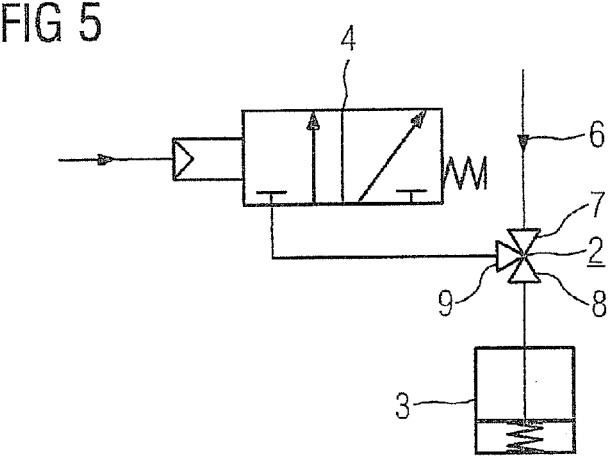
FIG. 5 shows the valves when the turbine is started.
Figure 6:
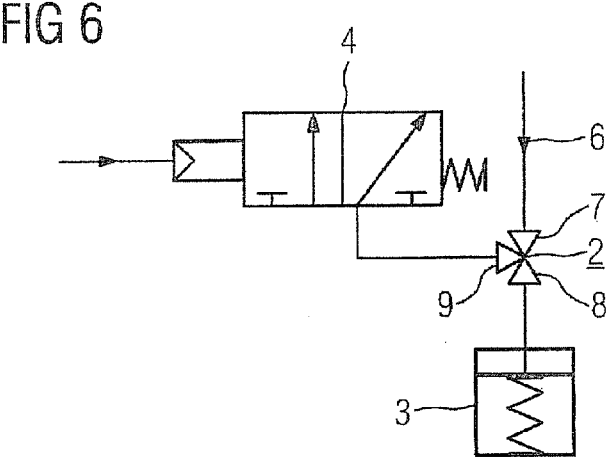
FIG. 6 shows the valves when the turbine is stopping.

FIGS. 4 to 6 show the working principle of the inventive valve assembly comprising a solenoid valve 2, an actuator 3, drain valves 1 (not shown) and a safety valve 4.

When the gas turbine engine 10 is starting and the compressor exit 19 pressure is below 1 bar the safety valve 4 in FIG. 4 will be in open position and allow the actuator 3 to vent to atmosphere. In this state, the drain valves 1 can open and close at will. To open the drain valves 1 the solenoid 13 is de-energized and instrument air 6 cannot enter the actuator which is vented through the solenoid exhaust 9 and the open safety valve 4. To close the drain valves 1, the solenoid 13 would need to be energized and instrument air 6 could enter the actuator.

FIG. 5 shows the situation when the compressor reaches pressures above 1 bar. The NC (normally closed) solenoid 13 is energized, i.e. it opens the solenoid valve 2 to allow instrument air 6 to enter the actuator 3 by what the drain valves 1 are closed. In case of voltage drop on the solenoid 13 the safety valve 4 prevents the actuator 3 from venting, therefore keeping it shut. If the instrument air 6 fails, a non-return valve at the solenoid air inlet 7 avoids that the actuator 3 is vented.

During shutdown of the gas turbine engine 10 shown in FIG. 6, the compressor pressure drops below 1 bar and the safety valve 4 opens and allows the actuator 3 to open and drain the gas turbine engine 10.

What is claimed is:

1. A valve assembly for a gas turbine engine, comprising:
    at least two drain valves connected to the gas turbine engine to drain oil and moisture from the engine;
    an actuator for opening and closing the at least two drain valves;
    a solenoid valve having an inlet/outlet port, an air inlet port and an exhaust port, wherein the inlet/outlet port is connected to the actuator and the air inlet port is connected to an air supply having a relatively constant air pressure for driving the actuator wherein when the solenoid valve is energized the inlet/outlet port and the air inlet port are in communication to enable air to be supplied to the actuator and when the solenoid valve is de-energized the air to the actuator is blocked and the actuator is vented through the exhaust port; and
    a safety valve connected to the exhaust port of the solenoid valve and to a compressor exit, the compressor exit driving the safety valve to prevent the actuator from being vented during engine operation.

2. The valve assembly as claimed in claim 1, wherein the at least two drain valves are operated simultaneously by a single actuator.

3. The valve assembly as claimed in claim 2, wherein the actuator comprises a spring and a stem.

4. The valve assembly as claimed in claim 1, wherein the drain valves open and close at will below a compressor exit pressure of 1 bar.

5. The valve assembly as claimed in claim 1, wherein the drain valves are prevented from opening above a compressor exit pressure of 1 bar.

6. The valve assembly as claimed in claim 1, wherein a drain valve is connected to the exhaust casing of the gas turbine engine.

7. The valve assembly as claimed in claim 1, wherein a drain valve is connected to the combustion chamber.

8. The valve assembly as claimed in claim 1, wherein a drain valve is connected to the turbine section.

9. The valve assembly as claimed in claim 1, wherein the drain valves have position indicators in order to show the opening position.

10. The valve assembly as claimed in claim 1, wherein the actuator has a plurality of position switches.

11. The valve assembly as claimed in claim 1, wherein the safety valve has a position indicator.

12. The valve assembly as claimed in claim 1, wherein the air supply is instrument air or shop air.

13. The valve assembly as claimed in claim 1, wherein the air supply is regulated to a value in the range between 3 and 4 bar.

14. The valve assembly as claimed in claim 13, wherein the air supply is regulated to 3.8 bar.

15. The valve assembly as claimed in claim 1, wherein a regulator is used as check valve for the solenoid air inlet.

16. A method of securely operating a plurality of drain valves in a gas turbine engine, the method comprising:
    connecting top ports of the plurality of drain valves to an actuator in order for the actuator to control the opening and closing of the drain valves;
    connecting the actuator to an inlet/outlet port of a solenoid valve comprising a solenoid air inlet port connected to an air supply having a relatively constant air pressure wherein when the solenoid valve is energized the inlet/outlet port and the air inlet port are in communication to enable air to be supplied to the actuator and wherein the solenoid valve includes a solenoid exhaust port wherein when the solenoid valve is de-energized the air to the actuator is blocked and the actuator is vented through the exhaust port;
    connecting the solenoid exhaust port to a safety valve; and
    connecting the safety valve to a gas turbine compressor exit.

* * * * *